United States Patent [19]

Robertson

[11] Patent Number: 5,392,648

[45] Date of Patent: Feb. 28, 1995

[54] DEVICE FOR MEASURING A PRE-DETERMINED VOLUME OF LIQUID FLOWING THERETHROUGH

[75] Inventor: Paul A. Robertson, Chrishall, Great Britain

[73] Assignee: Minnesota Mining and Manufacturing Company, St. Paul, Minn.

[21] Appl. No.: 75,482

[22] PCT Filed: Dec. 17, 1991

[86] PCT No.: PCT/GB91/02251

§ 371 Date: Oct. 4, 1993

§ 102(e) Date: Oct. 4, 1993

[87] PCT Pub. No.: WO92/11512

PCT Pub. Date: Jul. 9, 1992

[30] Foreign Application Priority Data

Dec. 17, 1990 [GB] United Kingdom ............... 9027256

[51] Int. Cl.6 ................ G01F 11/04; 222 59; 222 159
[52] U.S. Cl. ........................ 73/239; 222/59
[58] Field of Search ............ 73/861, 861.05, 861.18, 73/239; 222/59, 159

[56] References Cited

U.S. PATENT DOCUMENTS

| | | | |
|---|---|---|---|
| 3,605,741 | 9/1971 | Sencer | 73/861.05 |
| 3,662,598 | 5/1972 | Spencer | 73/861.05 |
| 3,812,854 | 5/1974 | Michaels et al. | 128/194 |
| 4,051,723 | 10/1977 | Head et al. | 73/861.05 |
| 4,512,187 | 4/1985 | Sigwardt | 73/198 |
| 4,533,082 | 8/1985 | Maehara et al. | 239/102 |
| 5,152,456 | 10/1992 | Ross et al. | 239/102.2 |
| 5,261,601 | 11/1993 | Ross et al. | 239/102.2 |

FOREIGN PATENT DOCUMENTS

| | | |
|---|---|---|
| 257590 | 3/1988 | European Pat. Off. . |
| 2476306 | 8/1981 | France . |
| 945195 | 12/1963 | United Kingdom . |
| 1250451 | 10/1971 | United Kingdom . |
| 1432741 | 4/1976 | United Kingdom . |
| 1591881 | 7/1981 | United Kingdom . |
| 2089767 | 6/1982 | United Kingdom . |
| 2126193 | 3/1984 | United Kingdom . |
| 2203492 | 10/1988 | United Kingdom . |
| 2233084 | 1/1991 | United Kingdom . |
| 2240494A | 6/1991 | United Kingdom ......... B05B 11/02 |
| 86/03290 | 6/1986 | WIPO . |
| 90/10197 | 9/1990 | WIPO . |

Primary Examiner—Richard E. Chilcot, Jr.
Assistant Examiner—Harshad Patel
Attorney, Agent, or Firm—Gary L. Griswold; Walter N. Kirn; Dale E. Hulse

[57] ABSTRACT

A gauge for measuring a pre-determined volume of liquid flowing through a conduit. A slug having substantially neutral buoyancy is positioned within the conduit and moves along the conduit at substantially the same rate as the liquid flowing therein. The slug is free to move within a constraint system defining a length of the conduit. The gauge further comprises detection means capable of detecting when the slug has moved a predetermined distance within the conduit.

19 Claims, 5 Drawing Sheets

DEVICE FOR MEASURING A PRE-DETERMINED VOLUME OF LIQUID FLOWING THERETHROUGH

FIELD OF THE INVENTION

This invention relates to a gauge for liquid flow measurement and in particular to a gauge for detecting when a pre-determined volume of liquid has passed through the gauge.

Background of the Invention

Certain liquid delivery systems require a predetermined volume of liquid to be repeatedly delivered. There are many known metering devices for measuring volumes of beverages, particularly beer and lager, and other liquids such as chemicals etc., which comprise pressure driven constant displacement pumps in which one side of a sealed piston in a cylinder is pressurized to push the piston which in turn pushes liquid out the cylinder from the other side of the piston. Valves are used to interchange the high and low pressure sides with respect to the piston such that two way reciprocating metering and dispensing of pre-determined volumes can occur. The accuracy of the volume dispensed depends on the ability to control the length of the stroke of the piston and there are a variety of means to detect and control the piston end stop position. Examples of such metering devices are disclosed, for example, in British Patent Specifications Nos. 2233084, 2126193, 2112177, 2089767, 1591881, 1432741 and 1250451.

A further liquid delivery system which requires a pre-determined volume of liquid to be repeatedly delivered is an inhaler which delivers metered doses of a liquid in the form of a dispersion of fine droplets in air, more particularly droplets of a drug solution or suspension for inhalation. The inhaler may comprise a reservoir of drug solution or suspension from which a metered volume is supplied to an aerosol generator to create the dispersion of droplets for delivery to the patient. Such inhalers are disclosed and claimed in our co-pending PCT Patent Publication No. WO92/11050.

Summary of the Invention

The present invention provides a gauge for liquid measurement which is capable of repeatedly measuring a pre-determined volume of liquid or suspension.

According to the present invention there is provided a gauge for measuring a pre-determined volume of liquid flowing therethrough comprising a conduit for said liquid and a slug positioned within said conduit, the slug having substantially neutral buoyancy in the liquid to be measured and being constructed and arranged such that it will move along the conduit at substantially the same rate as liquid flowing therein and is capable of being moved through the conduit with no net flow of liquid, the conduit comprising a constraint system defining a length of the conduit within which the slug is free to move, the gauge comprising detection means capable of detecting when the slug has moved a predetermined distance within the conduit.

The gauge of the invention provides a simple effective means of measuring a pre-determined volume of liquid passing through a conduit. The gauge may be used to generate a signal when the pre-determined volume has been dispensed, which signal may be employed to activate control means used to control the liquid dispensing system. For example, the control means may deactivate a pump upon receiving a signal from the gauge and thereafter may cause the gauge to be reset.

The gauge essentially comprises a conduit which may conveniently be in the form of a tube of metal, plastics or glass. The conduit contains a slug which has a net density approximately matched to that of the liquid to be measured so that the slug has substantially neutral buoyancy in the liquid. The slug is preferably dimensioned such that it is slightly smaller than the bore of the tube and will move along the tube at the same rate as the liquid flow therein. The gauge includes means to detect the slug when the slug has moved a predetermined distance. Thus, during the distance moved to the detection point a volume of liquid approximately equivalent to: (the distance moved by the slug x cross-sectional area of bore of tube) will have been dispensed. Thus, by selecting suitable dimensions for the bore of the tube and the distance to be moved by the slug before its detection, the desired pre-determined volume may be measured. The gauge is particularly suitable for measurement of small volumes and gauges having a tube length of 10 mm with a bore of 1 mm have proved to be effective. The gauge may desirably include a stop downstream of the detection point for the slug to confine the slug within a restricted area. The gauge operates without any need for inclusion or ingress of air or any other gas, enabling protection of the liquid being dispensed from the effects of inclusion or dissolution of such air or other gas or from the effects of reaction with it.

Generally, the conduit is provided with an upstream stop against which the slug may abut in its starting or reset position and the detection means detects the presence of the slug a predetermined distance from the stop. The slug may be detected by capacitive, optical, electrical, magnetic or electro-magnetic means. In one embodiment of the invention, the slug contains magnetic material and is detected by monitoring the inductance of coils, generally positioned along the tube. The presence of magnetic material in the slug also provides a convenient means of resetting the slug against the upstream stop by utilizing a coil around the conduit at the reset position, through which coil a direct current is passed whereby the slug is attracted to the coil and moves into the reset position. The slug is dimensioned to allow upstream movement through the liquid with no net liquid flow as the liquid may flow around the slug as it is returned to its starting position.

The slug need not comprise magnetic material and may be reset by other means. For example, the slug may be reset by a push rod positioned downstream within the conduit, which push rod may be moved between a rest and a reset position by movement of an external magnetic or by a pair of spaced coils which are sequentially energized. The push rod should not make contact with the slug during the measurement phase of the operational cycle of the gauge.

The slug may conveniently be detected optically by projecting a light beam across the bore of the conduit which light beam is detected by a photodetector. When the slug passes down the bore of the conduit the beam is broken and the change in signal received by the photodetector signifies a measured volume of fluid has passed through the device.

In one embodiment of the invention the position of the slug may be continuously monitored thereby giving a continuous reading of volume dispensed.

BRIEF DESCRIPTION OF THE DRAWINGS

The invention will now be described with reference to the accompanying drawings in which.

DETAILED DESCRIPTION

Figure 1:
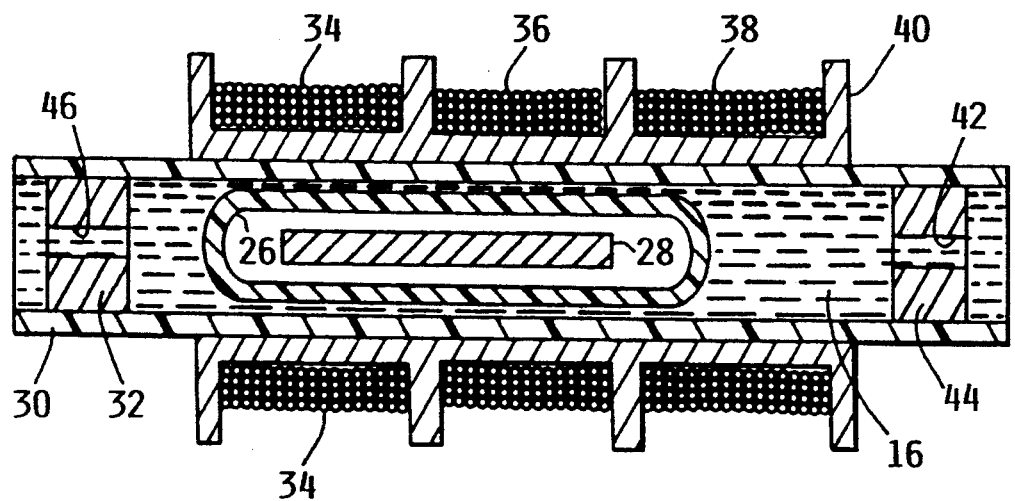
FIGS. 1 to 3 represent a diagrammatic cross-section through different gauges in accordance with the invention.
Figure 2:
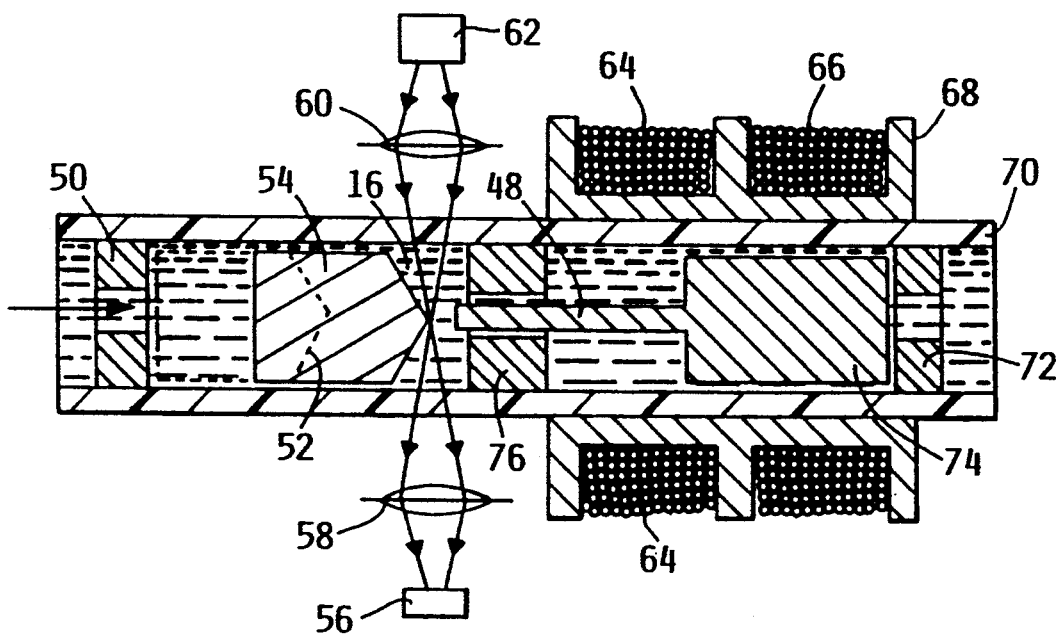
Figure 3:
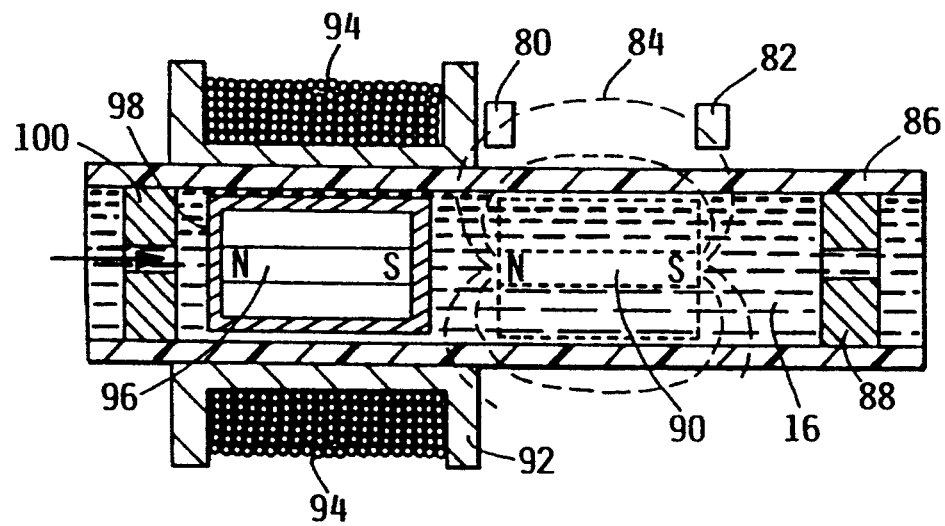

Referring to FIG. 1, a liquid dose gauge in accordance with the invention comprises a length of tubing (30) made of a suitable material such as glass or plastic which contains a free moving slug (26) made of a suitable material or composite of materials such as glass, plastic or metal. The slug (26) contains a small piece of steel wire, ferrite or other magnetic material (28) which is fixed within the slug and serves to enable the slug (26) to be magnetically reset against an end stop (32) in the tube (30) when an end coil (34) is energized with electrical current.

The net density of the slug (26) is matched to that of the liquid (16) such that the operation of the flow gauge is effectively independent of the unit orientation and motion. The slug (26) is restrained axially within a section of the tube (30) by the two end stops (32, 44). These end stops each contain a central aperture (42, 46) which allows the liquid (16) to flow through the gauge. The position of the slug (26) is monitored by an arrangement of three coils (34, 36, 38) wound on a former (40), configured as a differential transformer. In this case, the central coil (36) is energized with an alternating current at a frequency of the order of 10 kHz. The mutual inductance between the central coil (36) and each of the outer coils (34, 38) is dependent on the position of the magnetic material (28). If the coils (34, 38) are connected in anti-phase then a null output is obtained when the magnetic material (28) is disposed symmetrically between the coils. Hence this is a convenient end point to detect for the travel of the slug (26) as the liquid (16) flows through the gauge. The general concept of the differential transformer is well known to those versed in the art of measurement systems. From the above it may be seen that the coil (34) and the magnetic material (28) perform dual functions, i.e., that of resetting the slug (28) against end stop (32) and that of enabling the detection of the end point. End point detection may also be achieved using only a single coil (34), by monitoring the self inductance of that coil alone which will depend on the position of the magnetic material (28) within it. Typical dimensions for such a gauge may be approximately 10 mm in length with a tube bore of around 1 mm. A clearance of approximately 0.1 mm around the slug is suitable.

With reference to FIG. 2, the liquid dose gauge in accordance with a further embodiment of the invention comprises a tube (70) containing a measurement slug (54) of net density approximately matched to that of the liquid (16) which flows through the device. At the start of the measurement cycle, the measurement slug (54) is reset against an end stop (50) by a push rod (48) activated by a magnetic slug (74) acted upon by a direct current through coil (64), such that measurement slug 54 assumed the rest position designated by the dotted line 52. Once reset, the magnetic slug (74) and push rod (48), which is guided by a support (76), are withdrawn back to their rest position as shown by energizing the coil (66). An end stop (72) prevents the magnetic slug (74) from moving out of the zone of influence of the solenoid coils (64, 66) which are wound on a former (68). As the fluid (16) flows through the tube (70), the measurement slug (54) is carried along with the fluid flow until it breaks an optical beam from a source (62) which may comprise a bulb, light emitting diode or other such device and a lens (60). The beam is detected as a change in signal received by a collection lens (58) and photodetector (56) which may be a photodiode. As the beam is broken this event signifies that a metered dose of fluid (16) has passed through the device. The signal from the photodetector may be used to activate control means, e.g., to close a valve, deactivate a pump etc.

A further arrangement is shown in FIG. 3 where a single slug (98) is restrained within a tube (86) by end stops (100, 88). Here the slug (98) contains a small bar magnet (96) and is reset against the end stop (100) by energizing the coil (94) on a former (92) with an appropriate polarity of direct current. As the fluid (16) flows through the device the slug (98) is carried along with the flow until the magnet (96) reaches the position illustrated as (90). At this point the magnetic flux (84) from the magnet is detected with approximately equal magnitude by a pair of Hall effect sensors (80, 82) or other such sensors sensitive to magnetic flux. Hence a metered dose of fluid may be considered to have passed along the device. The end stop (88) prevents the measurement slug (98) from being carried out of the zone of influence, i.e., reset range of the solenoid coil (94).

With reference to FIG. 4, the liquid dose gauge comprises a tube or channel (418) containing a measurement slug (424) with approximately neutral buoyancy in the liquid (416). At the start of the measurement cycle, the measurement slug (424) is reset against an end stop (422) by means of a magnetic slug (406) and a moving external magnet or magnetic field (not shown). The magnetic slug (406) is then returned against the end stop (420). A light source (408) such as a light emitting diode projects light through a pair of apertures (412 and 414) onto a photodiode (410). As the liquid (416) flows through the device, the measurement slug (424) moves along to position (425) whereupon the slug (424) blocks out about half of the light passing through the apertures (412 and 414) onto the photodiode (410). Electronics connected to the photodiode (410) detects this optical signal change and indicates that the liquid (416) dose has been delivered.

With reference to FIG. 5, electronic circuits to interface to the dose gauge are illustrated. The light emitting diode (LED) (408) is driven by oscillator components (102, 104, 106 and 108) and driver components (110 and 112). The drive frequency is typically around 1 to 10 kHz and enables the optical receiver to distinguish the signal from any background light. The photodiode (410) is connected to a transimpedance amplifier circuit (118 and 120) and is a.c. coupled to pass the modulation into an amplifier circuit (122, 124, 126, 128 and 130).

Figure 4:
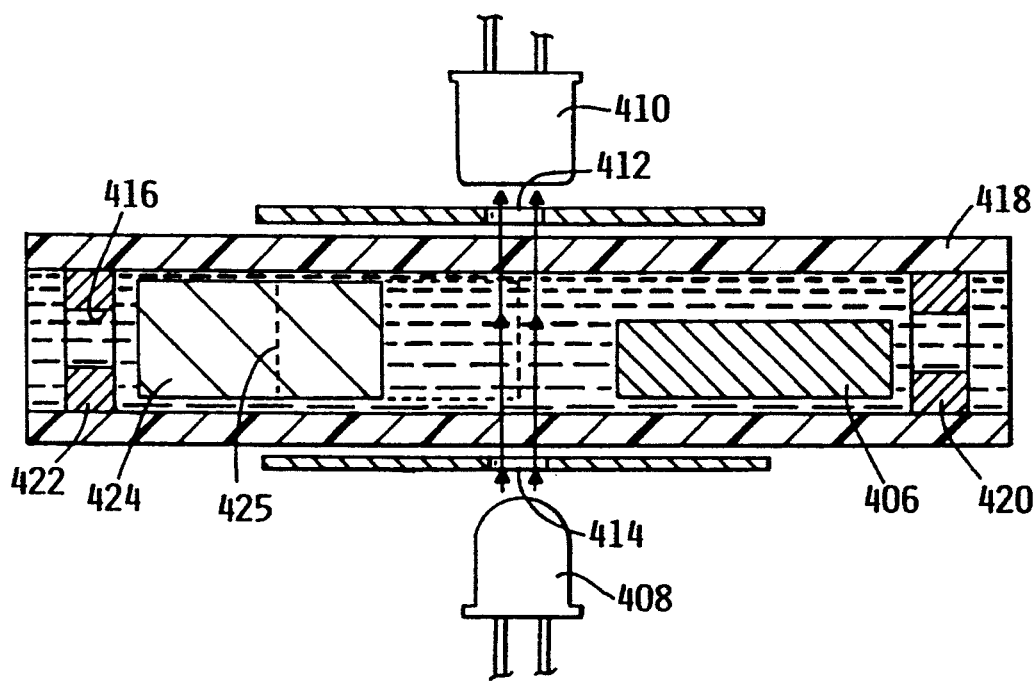
FIG. 4 represents a diagrammatic cross-section through a further gauge in accordance with the invention.
Figure 5A:
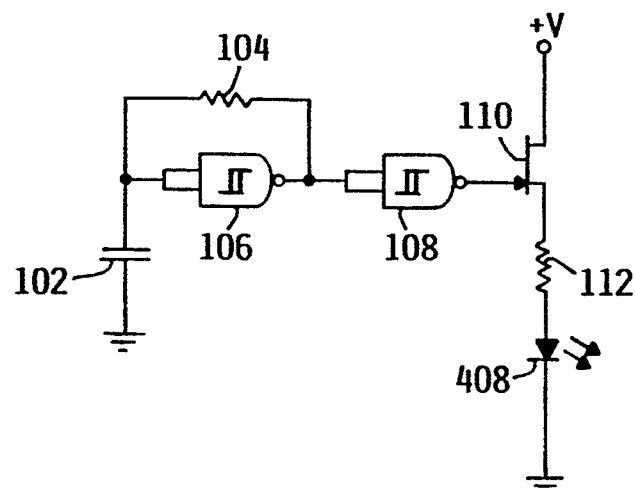
FIG. 5 represents diagrams of electronic circuits suitable for use with the gauge of FIG. 4.
Figure 5B:
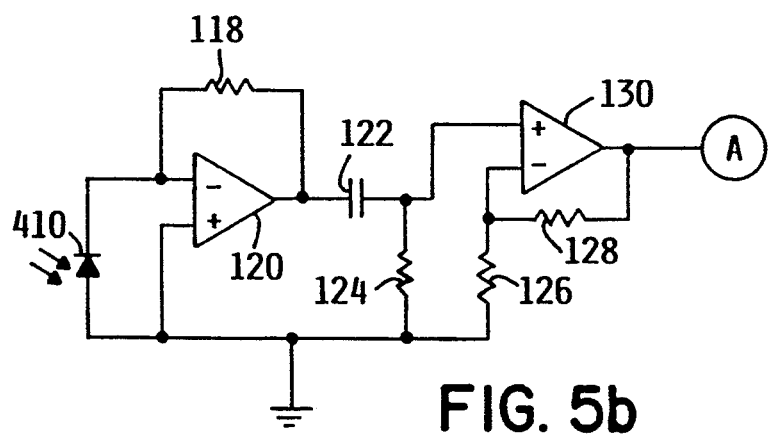
Figure 5C:
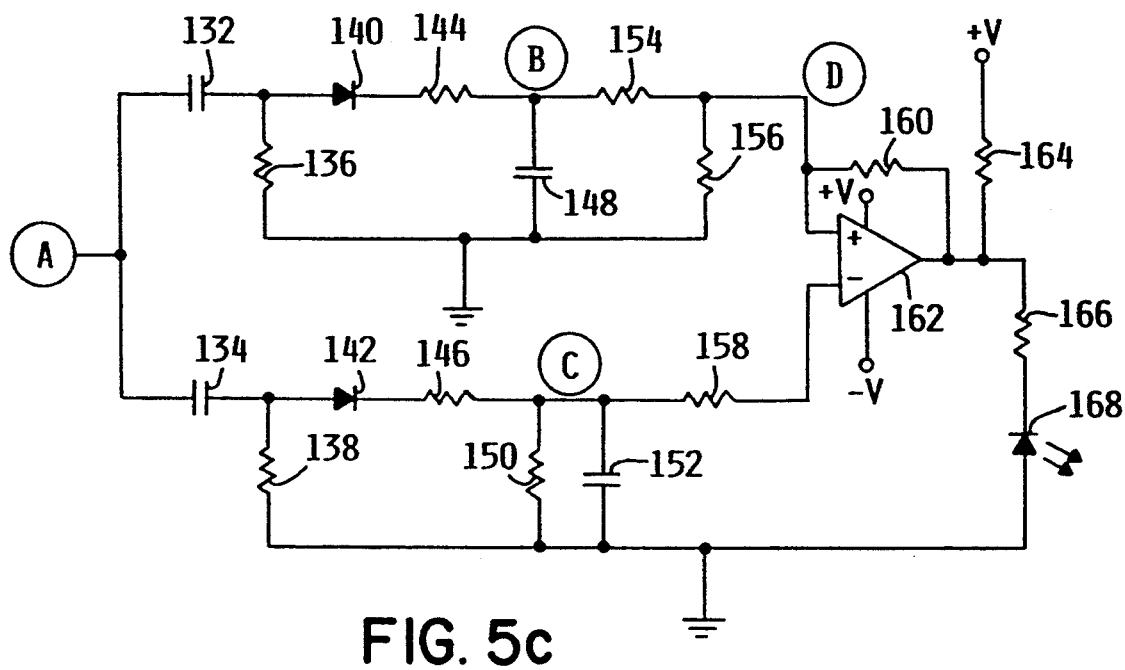

Point A therefore carries an amplitude modulated signal. When the measurement slug (424) in FIG. 4 does not obscure the apertures (412 and 414) then a steady state a.c. signal is present on point A. A demodulation circuit with a time constant of around 0.1 to 1 second (132, 136, 140, 144, 148, 154 and 156) generates a d.c. voltage at point B related to the signal amplitude. A second parallel demodulator circuit with a shorter time constant of around 1 to 10 milliseconds (134, 138, 142, 146, 150, 152 and 158) generates a d.c. voltage at point C. The voltage at point B is potentially divided by a factor of around 2 and compared to the voltage on point C by a comparator circuit (162, 160 and 164). State indication of the comparator is achieved by driving an LED (168) through a resistor (166). In the steady state with light passing across the gauge, the comparator drives the LED (168) on. When the apertures (412 and 414) shown in FIG. 4 are partially obscured, i.e., about half-way across, by the slug (424) as it moves, then the transient change in signal amplitude at point A is followed by the faster demodulator (but not by the slower one). Hence, the voltage at point C dips below that at point D (which is about half that at point B) and the comparator state changes, extinguishing the drive to the LED (168). Hysteresis provided by resistors (154, 156 and 160) maintains the comparator state until the optical signal magnitude increases when the slug (424) is reset.

Figure 6:
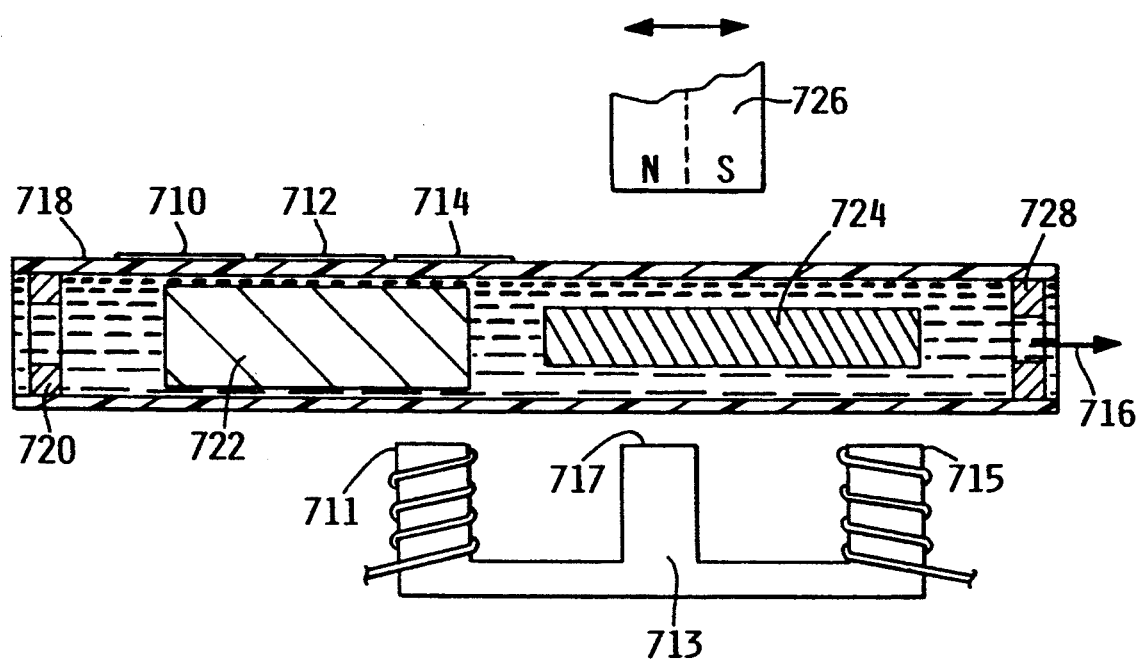
FIG. 6 represents a diagrammatic cross-section through a further gauge in accordance with the invention.

FIG. 6 of the accompanying drawings illustrates a capacitive flow gauge sensor in accordance with the invention with magnetic or electromagnetic reset means.

The gauge comprises a tube (718) through which liquid flows in the direction of arrow (716). A neutral buoyancy measurement slug (722) is positioned between upstream stop (720) and downstream stop (728). The position of the measurement slug is monitored by upstream, middle and downstream electrodes (710, 712 and 714) as described hereinafter.

The magnetic slug (724) resets the measurement slug (722) against upstream end stop (720). The magnetic slug (724) is moved manually by a magnet (726) or electromagnetically by coils (711 or 715) wound on magnetic core (713). When coil (711) is energized the magnetic slug (724) straddles the pole (717) and the pole of coil (711), thereby resetting the measurement slug (722). During measurement, coil (715) is energized thereby moving the magnetic slug (724) across pole (717) and the pole of coil (715). A similar cycle can be achieved with mechanical motion of the magnet (726).

The measurement slug (722) position is monitored by the relative mutual capacitances between electrodes (710, 712 and 714) which change since the slug relative permittivity can be very different to that of the liquids, e.g., for plastics the relative permittivity is around 2 to 5, whereas for aqueous or alcohol solutions it can be around 20 to 80.

With the slug (722) positioned symmetrically under electrodes (710, 712 and 714) as shown in FIG. 6, a null signal can be obtained from the middle electrode (712) if the upstream and downstream electrodes (710 and 714) are driven with an alternating voltage in anti-phase to each other. An imbalance in the so formed capacitance bridge will result if the slug (722) moves from the balanced central position. Thus the null balance is a suitable end point detector for the flow gauge.

Figure 7:
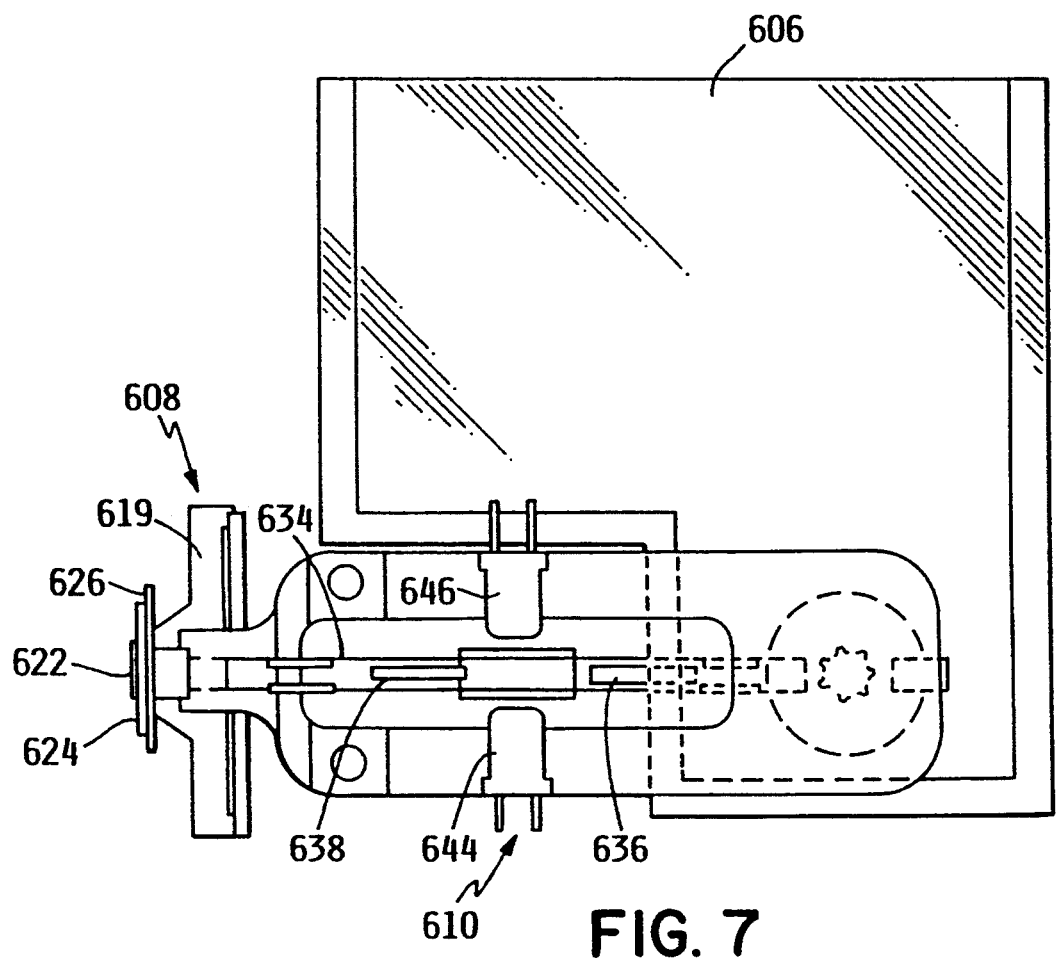
FIGS. 7 and 8 illustrate the use of a dose gauge of the invention with an aerosol generator suitable for use in an inhaler.
Figure 8:
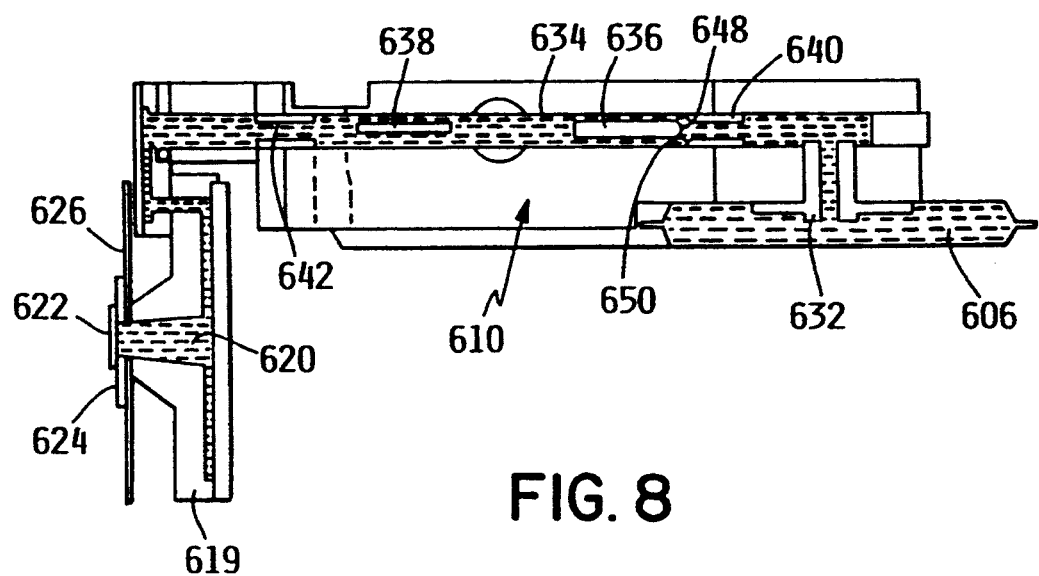

FIGS. 7 and 8 illustrate a dose gauge in accordance with the invention for controlling the dose of medicament from an aerosol generator in an inhaler. The aerosol generator comprises a housing (619) defining a chamber (620) having at one end a nozzle array (622). The chamber is in communication with a reservoir (606) via a dosage gauge (610). A vibrator element comprising a piezo-electric ring (624) mounted on a metal disc (626) is attached in close proximity to the nozzle array (622) such that ultrasonic energy from the vibrator element is transferred directly to the nozzle array. The diameter of the metal disc (626) is preferably about 20 mm, and it is attached to housing (619) at the central portion of metal disc (626). The vibrator element is preferably driven at high frequency e.g. 250 to 400 kHz to provide a good flow rate through the aerosol generator and to reduce the effect of bubble formation.

The aerosol generator (608) is sealed by a cap (not shown) which is positioned over the nozzle array (622) when the aerosol generator (608) is not in use. The cap is carried on a slider which is moved by a lead screw driven by a motor. When the motor is activated, the slider is moved so as to displace the cap away from the aerosol generator (608).

The dosage gauge (610) is positioned between a reservoir (606) for medicament and the aerosol generator (608). The reservoir (606) comprises a sachet which is heat sealed around its margins and comprises a connector (632) to provide a liquid communication with the dose gauge (610). The dose gauge comprises a tube (634) containing a neutral buoyancy measurement slug (636), a magnetic reset slug (638) an upstream end stop (640) and a downstream stop (642). The detection means for the slug (636) comprises a light emitting diode (644) and a photodiode (646). The slug (636) is conveniently provided with a shaped end (648) e.g. hemispherical, which may be held in sealing engagement with a corresponding shaped surface (650) at the end of the upstream stop (640) to provide a valve preventing liquid flow. The slug (636) is held against the stop (640) by moving the magnetic slug (638) upstream and holding the magnetic slug in that position. Movement of the magnetic slug (638) is accomplished by an external magnet which may conveniently be mounted on the slider of the cap and traverses the length of the tube externally thereof. Thus, when the cap is in the closed position the magnetic slug (638) will be moved to its upstream position holding the slug (636) against the upstream stop (640), thereby acting as a closed valve. When the cap is moved to its opened position the magnet will be moved with the slider causing movement of the magnetic slug to its downstream position, thereby allowing movement of the slug (636) when the aerosol generator is operated. Operation of the aerosol generator causes dispensing of the liquid medicament and movement of the slug (636) downstream to be detected by the detection system comprising the light emitting diode and photo-diode. The detection system may be of the digital type i.e. providing dose not completed and dose completed outputs only to switch off the aerosol generator when a dose has been administered, or it can be of the analogue type to give a continuous reading of volume dispensed from which the instantaneous flow rate can be derived for frequency tuning of the aerosol generator. For example, the circuit controlling the piezo-electric element (624) may be arranged to locate and maintain an element drive frequency which gives a flow rate exceeding a predetermined flow rate threshold. The analogue dose gauge may utilise a larger area light source and detector such that the received signal will vary according to the position of the slug (636).

I claim:

1. A gauge for measuring a pre-determined volume of liquid flowing therethrough comprising a conduit for said liquid and a measurement slug positioned within said conduit, the slug having substantially neutral buoyancy in the liquid to be measured and being constructed and arranged such that it will move along the conduit at substantially the same rate as liquid flowing therein and being capable of being moved through the conduit with substantially no net flow of liquid, the conduit comprising a constraint system defining a length of the conduit within which the slug is free to move, the constraint system comprising an upstream stop capable of preventing further movement of the slug, the measurement slug and the upstream stop being configured to block the conduit so as to substantially prevent the flow of liquid therethrough when the slug contacts the upstream stop, the gauge comprising detection means capable of detecting when the slug has moved a predetermined distance within the conduit.

2. A gauge as claimed in claim 1 in which the detection means is capable of detecting the presence of the slug at a predetermined position within the conduit spaced from said stop.

3. A gauge as claimed in claim 2 in which the slug comprises a magnetic material and wherein the gauge further comprises a coil positioned in the vicinity of the upstream stop, said slug being attracted towards said upstream stop when a direct current is passed through the coil.

4. A gauge as claimed in claim 2 which additionally comprises a push rod capable of engaging the measurement slug, the push rod being capable of moving said measurement slug to a reset position located at the upstream stop.

5. A gauge as claimed in claim 4 in which the push rod comprises a magnetic material and is movable to the reset position by magnetic attraction.

6. A gauge as claimed in claim 5 in which the magnetic attraction is provided by a pair of spaced coils through which a direct current is sequentially passed.

7. A gauge as claimed in claim 5 in which the magnetic attraction is provided by a permanent magnet which is capable of being moved to cause the push rod to move.

8. A gauge as claimed in claim 1 in which the slug is made of a magnetic material, a conductive material, or combinations thereof, and the detection means comprises at least one coil and means to monitor the inductance of the coil(s).

9. A gauge as claimed in claim 1 in which the slug comprises a magnetic material and the detection means comprises a sensor sensitive to magnetic flux.

10. A gauge as claimed in claim 9 in which the detection means comprises two sensors sensitive to magnetic flux spaced apart and means to generate a signal when the magnetic flux from the slug is detected with equivalent magnitude by each sensor.

11. A gauge as claimed in claim 1 in which the detection means comprises means for projecting an optical beam across the conduit to a photodetector, whereby when the slug reaches the detection means the beam is broken, thereby modifying the light detected by the photodetector.

12. A gauge as claimed in claim 1 in which the slug comprises a magnetic material and wherein the detection means comprises three coils wound around the conduit, said three coils including one center coil in between two outer coils, the center coil being energized by alternating current such that mutual inductance between the center coil and outer coils is dependent upon the position of the slug.

13. A gauge as claimed in claim 1 in which the detection means comprises a plurality of electrodes positioned along the conduit and means to measure the relative mutual capacitances between said electrodes as the slug moves.

14. A gauge as claimed in claim 1 which comprises a stop positioned downstream of the detection means, said slug being confined between such downstream and upstream stops.

15. A gauge as claimed in claim 1 in which the detection means continuously monitors the position of the slug to provide a signal representative of instantaneous flow rate.

16. A gauge as claimed in claim 1 further comprising an aerosol generator in fluid communication with said conduit and means for conveying the liquid from said conduit to said aerosol generator, said aerosol generator being capable of dispensing said liquid in the form of a dispersion of fine droplets.

17. A gauge as claimed in claim 16 wherein said aerosol generator comprises means for vibrating said aerosol generator so as to dispense the liquid therefrom as a dispersion of fine droplets, and wherein the gauge further comprises an electrical circuit controlling the vibrating means, said electrical circuit being capable of locating and sending an electrical signal to the vibrating means such that said vibrating means oscillates at a frequency sufficient to provide a flow rate within the conduit which exceeds a pre-determined flow rate threshold.

18. A gauge as claimed in claim 1 further comprising a reset slug capable of engaging the measurement slug, the reset slug being capable of moving said measurement slug to a reset position located at the upstream stop.

19. A gauge as claimed in claim 1 further comprising a reservoir for holding said liquid and means for conveying said liquid to said conduit.

* * * * *